June 1, 1948.   B. E. HOUSE ET AL   2,442,601
BRAKE CONTROL VALVE FOR TRACTORS
Filed July 14, 1944   3 Sheets-Sheet 1
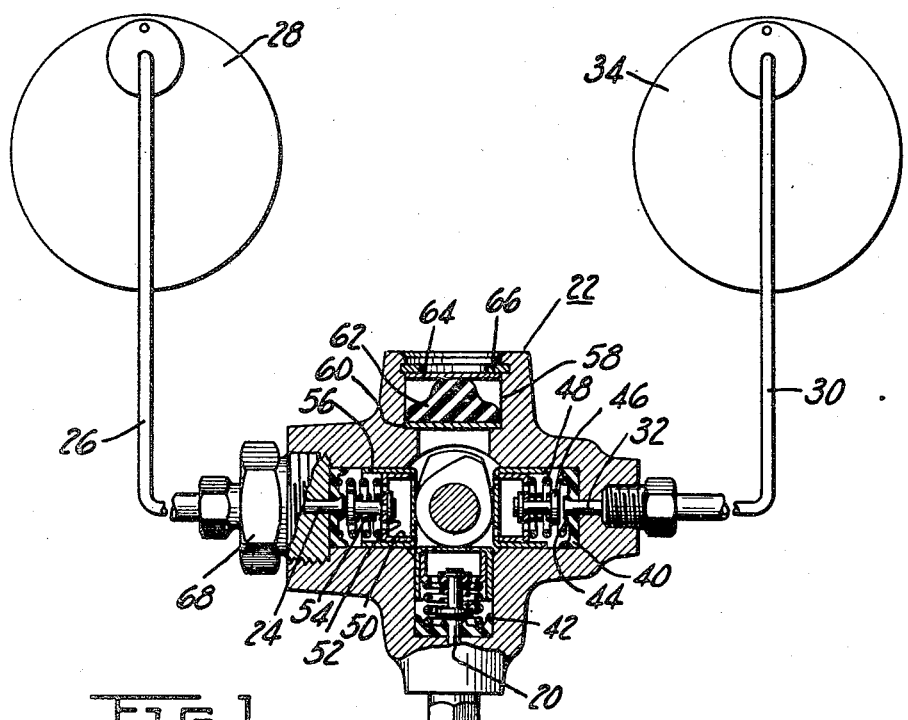
FIG.1
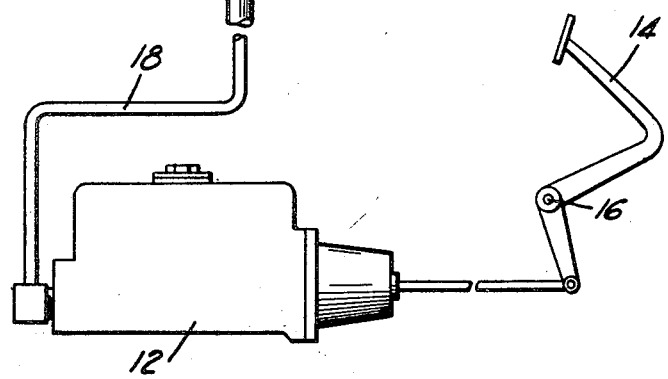
INVENTORS
BRYAN E. HOUSE
BY  RUDOLPH A. GOEPFRICH
ATTORNEY

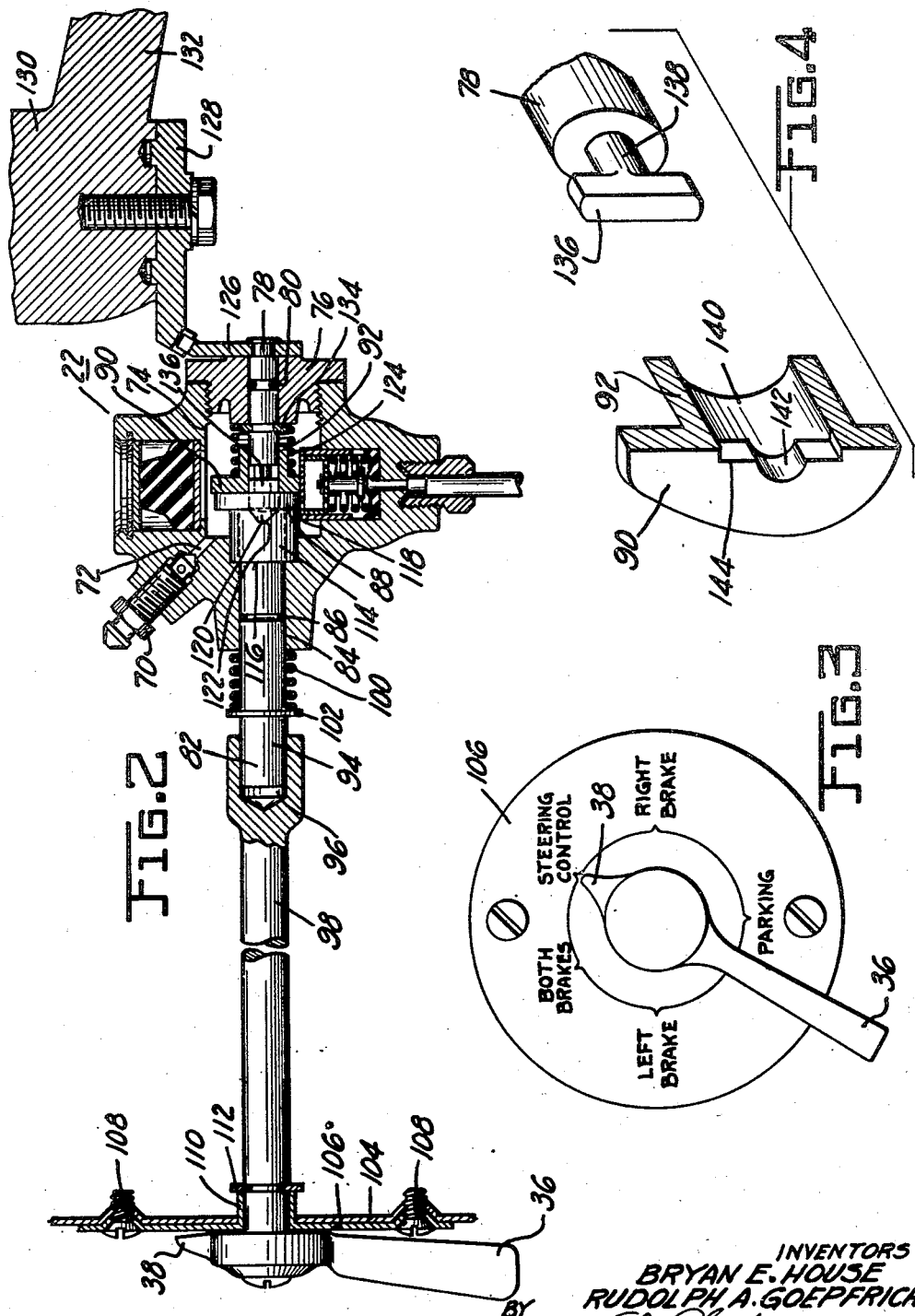

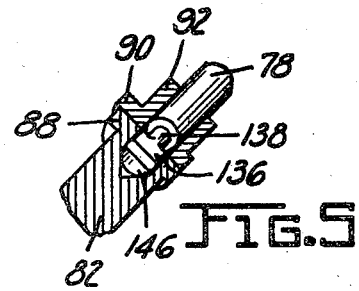
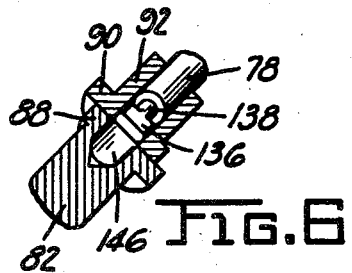
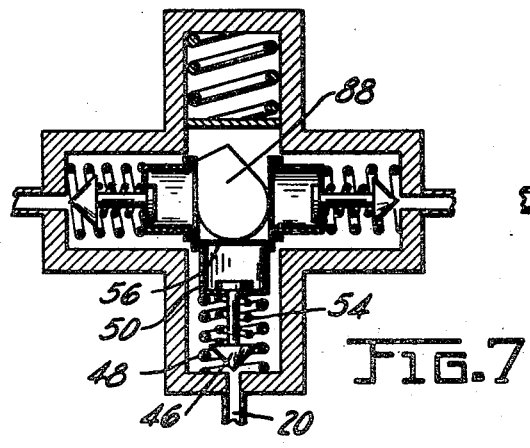
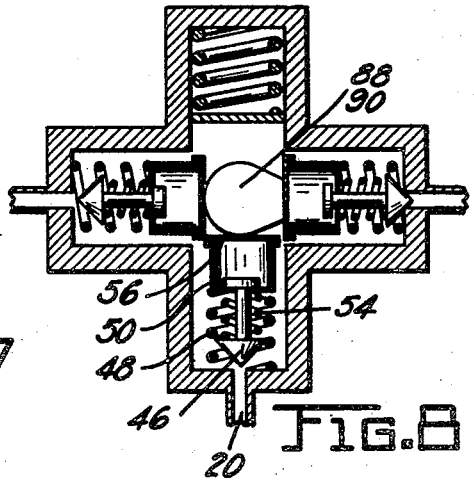
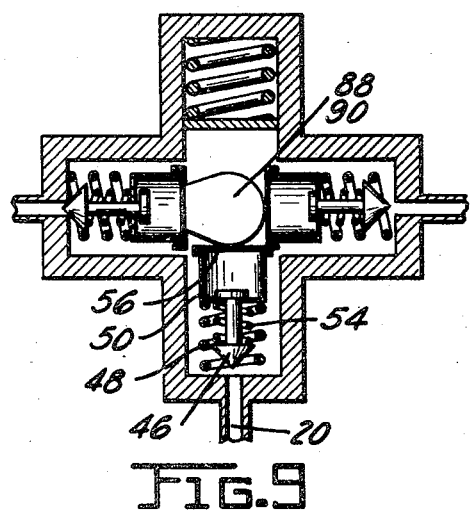
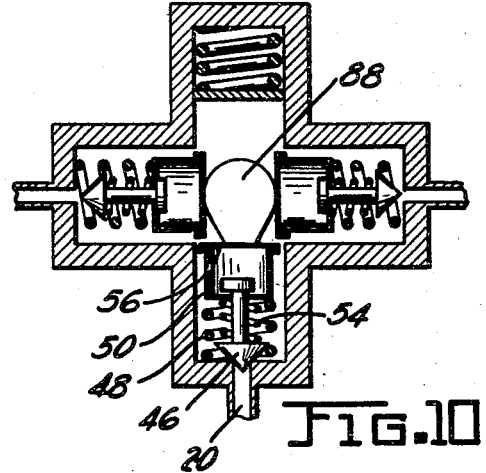

Patented June 1, 1948

2,442,601

UNITED STATES PATENT OFFICE 2,442,601

BRAKE CONTROL VALVE FOR TRACTORS

Bryan E. House and Rudolph A. Goepfrich, South Bend, Ind., assignors to Bendix Aviation Corporation, South Bend, Ind., a corporation of Delaware Application July 14, 1944, Serial No. 544,902

5 Claims. (Cl. 180—18)

1

This invention relates to control for brakes, and particularly to valve mechanism controlling a fluid pressure system for actuating brakes.

An object of the present invention is to provide an improved vehicle braking system which will permit the operator to employ the brakes to assist in steering the vehicle.

Another object of the present invention is to provide improved valve means for a fluid pressure brake actuating system which can be automatically controlled by the steering mechanism of the vehicle to insure that, when desired, the brakes will assist in steering the vehicle in the proper manner.

A further object of the present invention is to associate with the aforesaid valve means, which can be automatically controlled by the vehicle steering mechanism, means for disengaging the steering mechanism from the valve means and operating said valve means by manual control.

A further object of the present invention is to provide brake controlling valve means which can be automatically regulated by the steering mechanism to cause the brakes to assist in steering the vehicle throughout the entire turning range of the steering mechanism, if desired. In other words, our invention makes it possible to operate valve means under control of the steering mechanism regardless of the smallness of the turning angle of the steering mechanism, without requiring said mechanism to turn through a relatively large predetermined angle from center before causing the brake operation to assist with the steering.

Another object of the present invention is to provide an improved valve construction which not only can cause the brakes to assist with the steering, but can also be utilized to lock fluid in the brakes and thereby provide a parking brake for the vehicle.

A still further object of the present invention is to provide an improved control for a combined braking and steering device having a simpler, neater, and more economical construction than has heretofore been suggested.

Other objects and advantages will become apparent during the course of the following description, reference being had therein to the accompanying drawings, in which:

Figure 1 is a diagrammatic view of a hydraulic braking system, showing in section control valve means adapted to, when desired, modify in certain respects the operation of the basic hydraulic system;

Figure 2 is a section taken through the control valve means at right angles to the section shown

2 in Figure 1, and showing also the manual actuating mechanism for the valve;

Figure 3 is an end view of the manual control, showing the dial and handle by means of which the operator selects the particular setting of the control valve means;

Figure 4 is a perspective view showing, in exploded position, one of the cams of the control valve means, and the driving shaft therefor;

Figure 5 shows elements of Figure 4 in their respective positions when the driving key and the cam are disengaged;

Figure 6 shows the position of the elements of Figure 4 when the driving key is engaged with the cam;

Figure 7 shows diagrammatically the position of one of the control cams when the hydraulic system is set for normal operation of the brakes;

Figure 8 shows diagrammatically the arrangement of the control valve mechanism when the left brake only is open to pressure created in the master cylinder;

Figure 9 shows the arrangement of the valve mechanism when the right brake only is open to master cylinder pressure; and Fig. 10 shows the arrangement of the valve mechanism when the hydraulic system is adapted to hold the brakes for parking purposes.

Referring to Figure 1, it will be seen that a hydraulic brake actuating system is provided, including a conventional master cylinder 12 operated by the usual pedal 14, which is pivoted at 16. A conduit 18 connects the master cylinder outlet to inlet port 20 of a control valve device indicated generally at 22. An outlet port 24 of the control valve device is connected by means of conduit 26 to the actuating motor of the left brake 28, while a conduit 30 leads from outlet port 32 of valve device 22 to the actuating motor for the right brake 34.

Assuming that all of the valve members in the control device 22 remain open, the brake system operates in the usual manner, fluid under pressure being forced from master cylinder 12 to apply the brakes 28 and 34, and being returned to master cylinder 12 to release the brakes after the operator has released his pressure on pedal 14.

On certain vehicles, such as farm tractors, it is often desirable that the normal steering mechanism be assisted by control of the brakes. In other words, if the operator wishes to turn the vehicle, he can do this most effectively and most quickly if, in addition to turning the steering mechanism on the vehicle, he applies the inside brake only, thus tending to cause the vehicle to pivot at the braked wheel while the other wheel makes a circle to turn the vehicle. In farm tractors this arrangement is particularly applicable, because the brakes are usually provided on the rear driving wheels only, while the steering gear is associated with the front wheels.

We propose to provide means automatically controlled by the steering mechanism of the vehicle to select the vehicle brakes in such a way as to assist with the steering. Referring to Figure 3, it shows the face of a dial which might be used with the manually operable control handle 36, the pointer 38 being shown opposite the marking "Steering control." When the manually operated control handle is in this position, the arrangement is such that turning of the steering mechanism automatically selects the brakes to assist in steering. The dial shown in Figure 3 is also provided with several other markings. When the control handle is turned to "Both brakes," the system operates in the normal way, and pressure on the master cylinder pedal applies pressure to both the left and right brake. When the control handle is set to the marking "Left brake," operation of the master cylinder produces pressure only in the left brake, the right brake being blocked out by a valve member which will be hereinafter discussed. On the other hand, if operation of the right brake only is desired, the control handle is set to the marking "Right brake," and the left brake is cut off from the master cylinder so that braking pressure will act only on the right wheel. The fifth marking on the dial "Parking" is the setting of the control handle when the operator wishes the brakes to remain on for an indefinite period of time to hold the vehicle in parked position.

The mechanism which makes it possible for the various arrangements just discussed to be selected by the operator will now be described in full. The control device 22 is provided with three valves, which may be referred to as the left brake valve, the right brake valve, and the parking valve. It is quite convenient to use an identical construction for each of the valves as shown. Each of the valves include a rubber valve seat and seal 40 which is provided with a sealing lip 42 and a raised center portion 44 providing a valve seat, and a valve member 46 having a head adapted to contact the respective valve seat 44, and cut off the respective passage 20, 24 or 32. Each valve member 46 is normally held away from its seated position by means of a spring 48 acting on a cup shaped member 50 which contacts a collar 52 on the end of valve member 46. A lighter spring 54 urges the head of the valve member away from cup shaped member 50, in order that the head of the valve member will seat at 44 whenever the pressure of spring 48 has been overcome. A second cup shaped member 56, turned in the opposite direction from the member 50, may serve as a means for transmitting pressure to overcome the spring 48. Both cup members 50 and 56 are provided with a plurality of openings to permit the free passage of fluid therethrough.

In a bore 58, in the upper part of control device 22 are a plate 60 supported by a shoulder in the bore and a rubber block 62. This block is precompressed and held in position by a plate 64 and a snap ring 66 fitted into a groove in the bore. The periphery of the large diameter portion of this rubber block forms a seal for the fluid in the valve and the resilience of the block makes the plate 60 a spring loaded piston which is movable to compensate for expansion or contraction of the fluid when it is locked in the lines for parking purposes. The arrangement whereby the rubber block 62 forms both a spring acting on plate 60 and a seal with a fluid in the valve is claimed in application Serial No. 676,194, filed June 12, 1946, which is a division of the present application.

The bores in which the left and right valve members are located are preferably aligned, in order that they may both be formed by a single drilling operation from the left side of the valve. A plug 68, having the passage 24 therein, is screwed into the end of the drilled bore. In the same manner, the bore which contains the rubber expansion member 62, and the bore at the lower side of the valve may be aligned, and may be formed by a single drilling operation.

Referring to Figure 2, a bleed screw 70 is shown closing the bleed passage 72.

As shown in Figure 2, a transverse bore 74 may be drilled in the control device 22 to provide room for the members which control operation of the several valves. This bore is closed at one side by the plug 76 which is bored through in order that a shaft 78 may be journaled therein, the shaft being provided with an annular seal 80. At the opposite end of bore 74, a shaft 82 is journaled in a reduced diameter bore 84 in the body of control device 22, an annular seal 86 being located in a groove on shaft 82.

Two cam members are provided for independently controlling the valve members shown in Figure 1. One of these, cam member 88, is secured to or integral with the shaft 82. The other, cam member 90, is formed integral with a sleeve 92 supported on the shaft 78.

The end of shaft 82 farthest from cam member 88 is provided with a squared portion 94 fitting into a squared socket 96 which is formed on one end of a manually operable shaft 98. A spring 100 acting against a split ring 102 assembled in a groove in shaft 82 urges the latter to the left. The other end of shaft 98 passes through the dash 104 of the vehicle and has attached thereto the selector handle or lever 36. The dial 106 may be attached to the dash by means of a plurality of screws 108, and the dial may also be formed as shown at 110 to provide a bearing for shaft 98. A split ring or washer 112 locates shaft 98 longitudinally.

A fixed bushing 114 is mounted against shoulder 116 of control device 22 and has an end surface 118 against which cam member 88 is caused to bear by spring 100. The annular end surface 118 of the bushing may be provided with a plurality of detent depressions which are adapted to receive the nib 120 formed on cam member 88, the deepest of said detents being shown at 122. In addition, four other much shallower detents may be spaced circumferentially around the surface 118 of the bushing. The shallow detents, which are not shown, are provided for the purpose of yieldably maintaining the cam member 88 in any of the following four positions selected by the control handle: "Both brakes," "Left brake," "Right brake," and "Parking brake."

The end surface 118 of bushing 114 and the nib 120 on cam member 88, in effect, constitute a cam means for determining the axial position of both cam members 88 and 90. It is obvious that the riding of nib 120 on surface 118 of the bushing determines the axial position of cam member 88, the end 94 of shaft 82 sliding in socket 96 to permit such axial movement. Cam member 90 is axially moved by contact with cam member 88, a spring 124 holding the two cam members in contact.

A segmental gear 126 is secured to shaft 78. A second segmental gear 128, which is in mesh with gear 126, is secured to the pitman arm shaft 130 of the vehicle, the pitman arm being indicated at 132. Turning of the steering mechanism by the operator causes the shaft 130 to turn, and with it the gear 128. This in turn acts through gear 126 to turn shaft 78.

Shaft 78 is longitudinally located by means of a split ring 134 fitting in a groove in the shaft.

When it is desired that the brakes automatically assist in steering the vehicle, the cam member 90 is driven by shaft 78. On the other hand, if the brakes are not intended to automatically assist in steering, the shaft 78 is allowed to run free, thus having no effect on the valve members in the control device 22. The means whereby cam member 90 is connected and disconnected from shaft 78 are shown more clearly in perspective in Figure 4. The inner end of shaft 78 is provided with a key head 136 and a reduced diameter portion 138. The sleeve 92, which is integral with cam 90, is provided with a bore 140 sufficiently large to fit over shaft 78, and with a smaller bore 142 large enough to have some clearance over the reduced diameter portion 138 of the shaft. Both the bore 142 and slots 144 are cut through a wall of substantially the same thickness as the length of the key head 136, the wall being located at the cam head end of sleeve 92. When the key head 136 is engaged with the slots 144, as shown in Figure 6, shaft 78 drives cam member 90. However, when the key head extends beyond cam member 90 and into the circular opening 146 (see Figure 5) in the end of cam member 88, rotation of shaft 78 has no effect on either cam member 90 or cam member 88.

The operation of control device 22 is as follows. When the handle 36 is set to the position marked "Both brakes," cam member 88 is in the position shown diagrammatically in Figure 7. Both the left hand valve and the right hand valve are open, and also the lower valve, thus permitting free communication between the master cylinder and both brakes, in order that the application of the brakes will be controlled in the usual way. The nib 120 on cam 88 will be located in a relatively shallow detent on surface 118 of the bushing, and the cam member 88 will therefore be farther to the right than shown in Figure 2, thus pushing cam member 90 out of engagement with key head 136 of shaft 78, and permitting the key head of the shaft to run free inside the opening 146 in the end of cam member 88.

When the pointer 38 is moved to the marking "Left brake," the cam member 88 is moved into the position shown in Figure 8, wherein the right hand valve is closed, thus cutting off the right brake from the master cylinder. The left hand valve remains open in order that the left brake can be applied, and the lower valve also remains open. Whatever pressure is produced in the master cylinder will therefore apply the left brake only. This arrangement is desirable when, for example, the left wheel is on a surface where it cannot get any traction, and the differential gearing therefore acts to rotate the left wheel, while the right wheel remains stationary. By locking the left brake without applying pressure to the right brake, the traction of the right wheel can be taken advantage of to pull the vehicle away. In this position of cam member 88, the shaft 78 remains disengaged from cam member 90. Because of this, there is no possibility of the steering mechanism overriding the manual selection of the valve and thereby preventing the desired brake selection. In order to explain this more fully, assume that the steering mechanism must be turned to the right in order to pull the left wheel away from the location where it has no traction. If the steering mechanism could not be disconnected or disassociated from the valves of control device 22, turning the steering wheel to the right would cause the braking pressure to apply only the right brake, and not the left brake. In other words, the operation would be exactly the opposite of that desired in this particular situation.

When the indicator 38 is set to the marking "Right brake," cam member 88 takes the position shown in Figure 9, wherein the left valve is closed and the right valve is open, thus permitting master cylinder pressure to apply only the right brake. The purpose of this is the same as that described in connection with the "Left brake" position of the indicator, except that the opposite brake is involved.

When the indicator is set to "Steering control," as shown in Figure 3, the nib 120 of cam 88 is in the relatively deep detent 122. This allows spring 124 to force cam member 90 into engagement with driving head 136 of shaft 78, as shown in Figures 2 and 6. With this arrangement, rotation of shaft 78 controls the operation of the left brake and right brake valves. When the steering mechanism is turned in such a way as to turn the vehicle to the right, the cam member 90 is moved to a position in which the left brake valve is closed, while the right brake valve remains open. Subsequent master cylinder pressure therefore applies only the right brake, causing the vehicle to tend to pivot on the right wheel, while the left wheel continues rotating to complete the turn. This arrangement is particularly advantageous in plowing, where a large number of relatively sharp turns are required. The mode of operation of cam member 90 may be substantially the same as that of cam member 88, and therefore Figure 9 may be considered as showing diagrammatically the position of the valves when the steering mechanism is turned to the right after "Steering control" has been manually selected.

If, with "Steering control" selected, the steering mechanism is turned to the left, shaft 78 will be turned by the pitman arm and gears to cause the cam 90 to take the position shown in Figure 8, closing the right brake valve, while the left brake valve remains open. Thus, master cylinder pressure will apply only the left brake, tending to pivot the vehicle on the left wheel while the right wheel makes the turn.

Thus shaft 78 is in driving engagement with cam member 90 only when "Steering control" is selected, and the automatic operation of the valve members by the steering mechanism does not interfere with manual operation of the valve members. This makes it possible to so design the control mechanism that the brakes will be able to assist with the steering no matter how small the angle of turning. It is not necessary to limit the automatic brake control to cases where the steering mechanism is turned to a large angle. Where it is desired that the brake operation assist with the steering, the assistance of the brakes may be as helpful with a small turning angle as with a large turning angle.

If the indicator is set to "Parking," cam member 88 will be in the position shown in Figure 10, wherein both the left brake valve and the right brake valve remain open, but the lower valve is permitted to close under the influence of the spring 54. This valve now acts as a one-way check valve between the master cylinder and the brake cylinders, permitting fluid under pressure to flow from the master cylinder toward the brakes, but not in the reverse direction, since the pressure of fluid built up in the system holds the valve closed. With this arrangement, the brakes can be set for parking. The resilient rubber member 62, which is diagrammatically indicated by a spring in Figure 10, will be partially compressed by the pressure locked in the brakes. If the volume of fluid locked in the system should decrease, the energy stored in the resilient member would make up for it, and retain the brakes in applied position. On the other hand an expansion of the fluid would further compress the resilient member without danger of injuring any of the parts. When it is desired to release the brakes, the cam member 88 is moved to another position, and the spring 48 opens the valve to allow the trapped fluid to return to the master cylinder.

If desired, the parking compensator may be so arranged as to be normally cut off from the brake lines, being in communication with said lines only during parking. This has the advantage that the work required to compress the resilient member is only done during setting of the brakes for parking, and the capacity of the brake system is not thereby reduced during normal operation. A practical application of this principle is illustrated in Figures 2, 3, and 8–10 of Kerr Patent No. 2,148,268.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. For use in a vehicle having a brake on each side and a hydraulic brake actuating system including a motor for each brake and a master cylinder, a control for said hydraulic brake actuating system comprising valve means operable to prevent one of the brakes from being applied by master cylinder pressure, valve means operable to prevent the other of the brakes from being applied by master cylinder pressure, valve means for trapping fluid under pressure in the motors to hold the brakes applied, and a single cam adapted to control all three of said valve means, said cam having a neutral position in which normal operation of the hydraulic braking system is not interfered with.

2. For use in a vehicle having a brake on each side and a hydraulic brake actuating system including a motor for each brake and a master cylinder, a control for said hydraulic brake actuating system comprising valve means operable when closed to prevent one of the brakes from being applied by master cylinder pressure, valve means operable when closed to prevent the other of the brakes from being applied by master cylinder pressure, valve means adapted when closed to trap fluid under pressure in the motors to hold the brakes applied, each of said valve means normally being held open, the several valve means being angularly spaced from one another but lying in substantially the same plane, a cam rotatable in said plane to cause any of said valve means to close, and manually operable means for rotating said cam.

3. For use in a vehicle having a brake on each side, a steering mechanism and a fluid pressure actuating system for the brakes, valve means associated with the system and operable when the steering mechanism is moved to turn the vehicle in one direction for causing the braking system when operated to apply only one of said brakes, other valve means associated with the system operable when the steering mechanism is moved to turn the vehicle in the other direction for causing the braking system when operated to apply only the other of said brakes, means for disassociating the steering mechanism from both of said valve means so that the operation of said steering mechanism will have no effect on the braking system, and manually operable means for controlling both of said valve means when the steering mechanism has been disassociated therefrom.

4. For use in a vehicle having a brake on each side, a steering mechanism and a fluid pressure actuating system for the brakes, valve means associated with the system and operable when the steering mechanism is moved to turn the vehicle in one direction for causing the braking system when operated to apply only one of said brakes, other valve means associated with the system operable when the steering mechanism is moved to turn the vehicle in the other direction for causing the braking system when operated to apply only the other of said brakes, means for disassociating the steering mechanism from both of said valve means so that the operation of said steering mechanism will have no effect on the braking system, means independent of said steering mechanism for controlling both of said valve means, and a single operator operated control arranged to actuate both the last-named means and the aforesaid steering mechanism disassociating means.

5. For use in a vehicle having a brake on each side, a steering mechanism and a fluid pressure actuating system for the brakes, a valve member operable when closed to prevent one of the brakes from being applied by pressure in the fluid system, a second valve member operable when closed to prevent the other of the brakes from being applied by pressure in the fluid system, a manually rotatable shaft, a cam on said shaft adapted to cause either of said valve members to close when the shaft is turned to a given position, a shaft driven by the steering mechanism having a driving key thereon, a second cam axially movable into or out of engagement with said driving key, said second cam when engaged with said driving key being rotated under the control of the steering mechanism to cause the selective closing of the aforesaid valve members, and cams means associated with the manually rotatable shaft for controlling axial movement of said second cam to cause it to move into or out of engagement with the driving key.

BRYAN E. HOUSE.
RUDOLPH A. GOEPFRICH.

REFERENCES CITED

The following references are of record in the file of this patent:

UNITED STATES PATENTS

| Number | Name | Date |
|---|---|---|
| 1,894,525 | Tatter | Jan. 17, 1933 |
| 1,918,465 | Gardner | July 18, 1933 |
| 1,974,323 | Allen | Sept. 18, 1934 |
| 2,012,872 | Gillen | Aug. 27, 1935 |
| 2,148,268 | Kerr | Feb. 21, 1939 |
| 2,331,214 | Milster | Oct. 5, 1943 |

Certificate of Correction

Patent No. 2,442,601.　　　　　　　　　　　　　　　　　　　　　　　June 1, 1948.

BRYAN E. HOUSE ET AL.

It is hereby certified that errors appear in the printed specification of the above numbered patent requiring correction as follows:

Column 1, line 1, for the word "control" read *controls*; column 7, line 41, for "in illustrated" read *is illustrated*; column 8, line 12, after "any" insert *one*; line 74, for "cams" read *cam*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*